April 16, 1968  R. H. OVERCASHIER  3,378,614
APPARATUS AND METHOD FOR EXTRUDING
THERMOPLASTIC MATERIALS
Filed Aug. 9, 1965
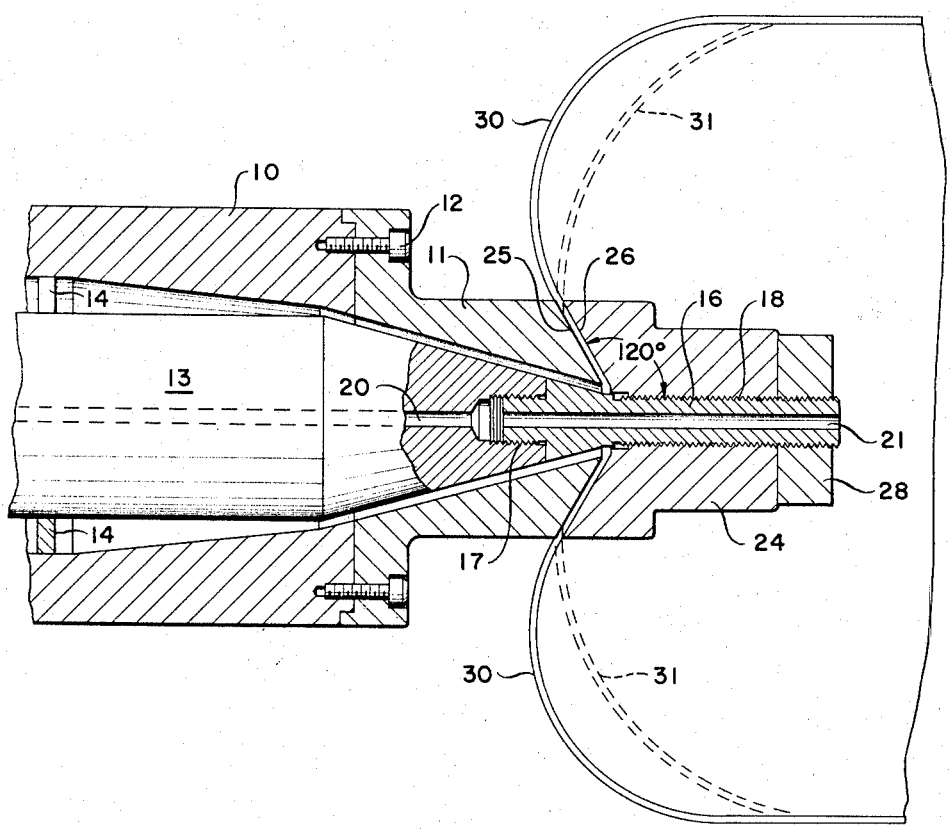
INVENTOR:
ROBERT H. OVERCASHIER
BY:
HIS ATTORNEY 3,378,614
APPARATUS AND METHOD FOR EXTRUDING
        THERMOPLASTIC MATERIALS
Robert H. Overcashier, Walnut Creek, Calif., assignor to
  Shell Oil Company, New York, N.Y., a corporation of
  Delaware
         Filed Aug. 9, 1965, Ser. No. 478,090
              3 Claims. (Cl. 264—51)

This invention relates to a method and apparatus for extruding thermoplastic materials. More, particularly, the invention relates to a method and apparatus for making foamed plastic sheets by extrusion of a cylindrically-shaped hollow tube or sock. The invention has specific application to the extrusion of films, sheets or boards of isotropic-cell foamed polypropylene which will possess an increased resistance to tearing and bending and be free of unidirectional furrows and similar surface imperfections. By isotropic-cell foam, I mean one in which the cells are macroscopically undimensional along the three conventional coordinate axes.

A conventional method of producing foamed plastic sheets and films comprises extruding a cylindrical sock out of a ring-shaped die orifice having a die-face perpendicular to the direction at which said sock flows away from the die orifices. In such a method the extruded thermoplastic tube or sock is pulled away from the die-face at a constant rate by a pair of pinch rolls while air is simultaneously introduced into the tubular extrudate and trapped between the die-face and the nip of the pinch rolls to form a bubble of the extrudate. The distance between the extrusion head and the pinching rolls is predetermined and the extrusion rate is such that the material is cooled sufficiently to a point of substantial dimensional stability. There results a flattened tube of foamed thermoplastic which then is slit along both edges to provide two sheets.

However, in many instances, and especially in the case of polypropylene, the foaming process is too rapid relative to the rate at which the sock or bubble periphery can be increased. Thus, as the sock travels the route between the circular orifice in the die-face and the final diameter of the expanded sock, new volume (due to the foaming action of the thermoplastic material) is being produced faster than the periphery can expand, thereby subjecting a portion of the periphery to compressive forces.

These compressive forces cause buckling which results in furrows which run longitudinally throughout the sock. The buckling in its advanced stages brings about permanent collapse of the cells along these lines or furrows. As a consequence, the resulting sheet is rough in texture and has low resistance to tearing in the direction in which the furrows run.

Accordingly, the primary object of this invention is to produce a sheet of uniform thickness while eliminating the compressive forces which prevent proper foaming of the extrudate and cause longitudinal furrows and similar surface imperfections in the finished sheet.

Prior attempts to alleviate the aforementioned buckling or furrowing have included speeding up the pinch rolls to better accommodate the new volume and the use of high gas pressure to increase the sock diameter so as to pull out the wrinkles and furrows. Both of these methods pull on the sock and thus result in cells which are elongated in the longitudinal and peripheral directions. These elongated cells have little resistance to deformation from forces applied in the normal direction and the resulting sheets have low crush strength and stiffness.

An important aspect of the invention is the discovery that the rate of increase in sock periphery can be speeded up relative to the foaming rate if the extrusion path between the die orifice and the final diameter of the sock is along the radii of a circle which are perpendicular to the longitudinal axis of the extruder. By forcing the material to follow such a path until substantially the final sock diameter has been reached the development of compressive stresses and the resultant furrowing could be minimized. However, it has been found that the melt issuing from an annular die orifice which forms a 90° angle with the longitudinal axis of the extruder will not flow for any appreciable distance in a true radial direction. As the melt issues from such a 90° die orifice it tilts or curves forward, almost immediately, in the direction of the pinch rolls. Two factors are thought to contribute to this departure from radial flow. First, the elevated gas pressure inside the sock causes the issuing surface to assume a curved shape. Secondly, relaxation of elastic stresses causes the melt to incline forward so as to resume the direction of travel it had before being turned to flow radially (stored-energy phenomenon of the melt).

The invention resides in extruding the plastic melt from an annular die orifice which forms an angle substantially greater than 90° with the longitudinal axis of the extruder (hereinafter termed a swept-back annular die). In this manner the overall flow path of the melt more nearly approximates a true radial direction for a greater distance between the die and the final diameter of the extruded sock.

An additional and highly significant advantage of using the swept-back annular die resides in the fact that the portion of the flow path which is most nearly radial is somewhat removed from the die lips. Such a path is especially well suited for those instances in which the foaming rate reaches a maximum after the sock has traveled part of the distance, measured radially, between the die lips and the final sock diameter. The swept-back die produces the largest radial velocity at some distance from the die lip. Hence the most rapid increase in the sock periphery (due to foaming) is occurring at approximately the same time that the flow path direction of travel is most nearly radial. As a result, the foam is less likely to experience compressive forces and is therefore less likely to buckle.

Other advantages of the invention will be better understood from the following detailed description when taken with reference to the accompanying drawing.

Referring to FIGURE 1 there is shown a die head 10 which is situated on the front end of a conventional screw-type extruder. A fixed die element 11 is attached to the die head 10 by a plurality of screw elements 12. As shown, both the die head 10 and the fixed die element 11 are annular and define an opening which becomes cone-shaped at the forward end.

A mandrel member 13 is symmetrically positioned within the cavity defined by the die head 10 and the fixed die element 11 and is held in placed by a plurality of spiders or struts 14 as shown. A stud member 16 is threadably secured, as at 17, to the forward end of the mandrel 13 and comprises a threaded portion 18 which extends outwardly beyond the fixed die element 11. Both the mandrel 13 and the stud 16 are provided with central bores 20 and 21, respectively, extending longitudinally therethrough for the passage of air or any other suitable gaseous media.

A movable die element 24 is internally threaded for engagement with the threaded portion 18 of the stud member 16. At this juncture it should be noted that the fixed die element 11 is provided with a die surface 25 which forms an angle substantially greater than 90° with the longitudinal axis of the apparatus. Correspondingly, the die face 26 of the movable die element 24 also forms an angle substantially greater than 90° with the longitudinal axis of the apparatus. Die face 26 may be essentially parallel to die surface 25, or it may differ in inclination by up to 15°, either convergingly or divergingly. The width of the extrusion passageway or orifice between the die faces 25 and 26 may be adjusted by rotating the movable die element 24 along the threaded portion 18 of the stud 16. As shown, a lock nut 28 is provided for threaded engagement with the threaded portion 18 of the stud 16 to lock the movable die element 24 in the desired position.

During operation of the device plastic melt is fed forward through the apparatus by means of a screw (not shown) located just behind the mandrel 13. The melt contains well known nucleating agents and blowing or foaming agents and is kept under pressure inside the apparatus to prevent foaming prior to leaving the die orifice defined by the die faces 25 and 26. The melt flows through the space between the mandrel 13 and the die head 10 which space gradually becomes smaller as in the vicinity of the fixed die element 11. Finally, the melt flows through the swept-back angled space defined by the die faces 25 and 26 and the foaming action begins as the melt issues therefrom in the form of a sock 30. Simultaneously, air or other gas is blown through the bores 20 and 21 to inflate the extrudate into a bubble or sock-like tube.

The path of a tubular extrudate or sock issuing from the swept-back die (in this case, forming an angle of 120° with the longitudinal axis of the extruder) in accordance with the invention is depicted in full lines by reference numeral 30. Shown in dotted lines at 31 is the flow path which a tubular extrudate or sock would assume if it issued from a die orifice which forms an angle of 90° rather than 120° with the longitudinal axis of the extrusion apparatus. As can be readily ascertained, the extrusion path depicted by the dotted lines 31 is only instantaneously radial after issuing from the orifice, whereas the extrusion path 30 issuing from the swept-back die approximates true radial flow over a substantial portion of its travel, and more importantly, this radial flow is achieved at a distance somewhat removed from the die lips.

The flow path 30 of the extrudate issuing from the swept-back die orifice has definite advantages over the 90° die orifice path 31. For example, there is a much larger portion of the path 30 which approximates a true radial direction. This is most important since the desired extrusion path necessary to prevent the compressive forces which cause furrowing is in the radial direction.

The optimum angle to insure a maximum radial flow path may vary between 110° and 160° depending upon the composition of the plastic melt, temperature, type of blowing and nucleating agents, etc. However, in general, this optimum angle will fall between 120° and 140°. Therefore, the term "substantially greater than 90°" as used throughout the specification and claims should be understood to mean an angle no greater than 160° nor less than 110°.

I claim as my invention:

1. A method of preventing furrows in a foamed thermoplastic tubular extrudate that moves in a forward direction comprising extruding said thermosplastic from an extruder apparatus at an angle substantially greater than 90° with respect to said forward direction, and flowing the extrudate thence outwardly along a curved path to said forward direction.

2. Apparatus for extruding a tubular extrudate of foamed thermoplastic in a forward axial direction comprising:
   (a) an annular die head having a central axis parallel to said direction;
   (b) an annular first die element fixedly secured to said die head and having a die face formed at an angle substantially greater than 90° with respect to the longitudinal axis of said die head measured from the forward direction;
   (c) mandrel means secured centrally within the space defined by said die head and said first die element to define a passageway therebetween; and,
   (d) a second die element operatively associated with said first die element and having a die face spaced from and at an angle substantially parallel to said first die face to define an annular extrusion orifice between said die faces.

3. Apparatus as set forth in claim 1 wherein:
   (a) said mandrel means is provided at its forward end with a threaded stud member;
   (b) said second die element is threadably received upon said stud member; and,
   (c) longitudinal bore means are provided centrally through both said mandrel and said stud.

References Cited

UNITED STATES PATENTS

| | | | |
|---|---|---|---|
| 3,079,636 | 3/1963 | Aykanian | 264—53 |
| 3,088,167 | 5/1963 | Corbett | 18—14 |
| 3,243,486 | 3/1966 | Pilaro | 264—95 |
| 3,249,670 | 5/1966 | Rottner et al. | 18—14 |

OTHER REFERENCES

Collins, F. H.: "Controlled Density Polystrene Foam Extrusion." In SPE Journal, July 1960, pp. 705–709.

Gliniecki, Vern: "Equipment Needed for the Extrusion of Expandable Polystrene Beads." In Plastics Design & Processing, September 1964, pp. 18–21.

ALEXANDER H. BRODMERKEL, *Primary Examiner.*

P. E. ANDERSON, *Assistant Examiner.*